Figure 1:
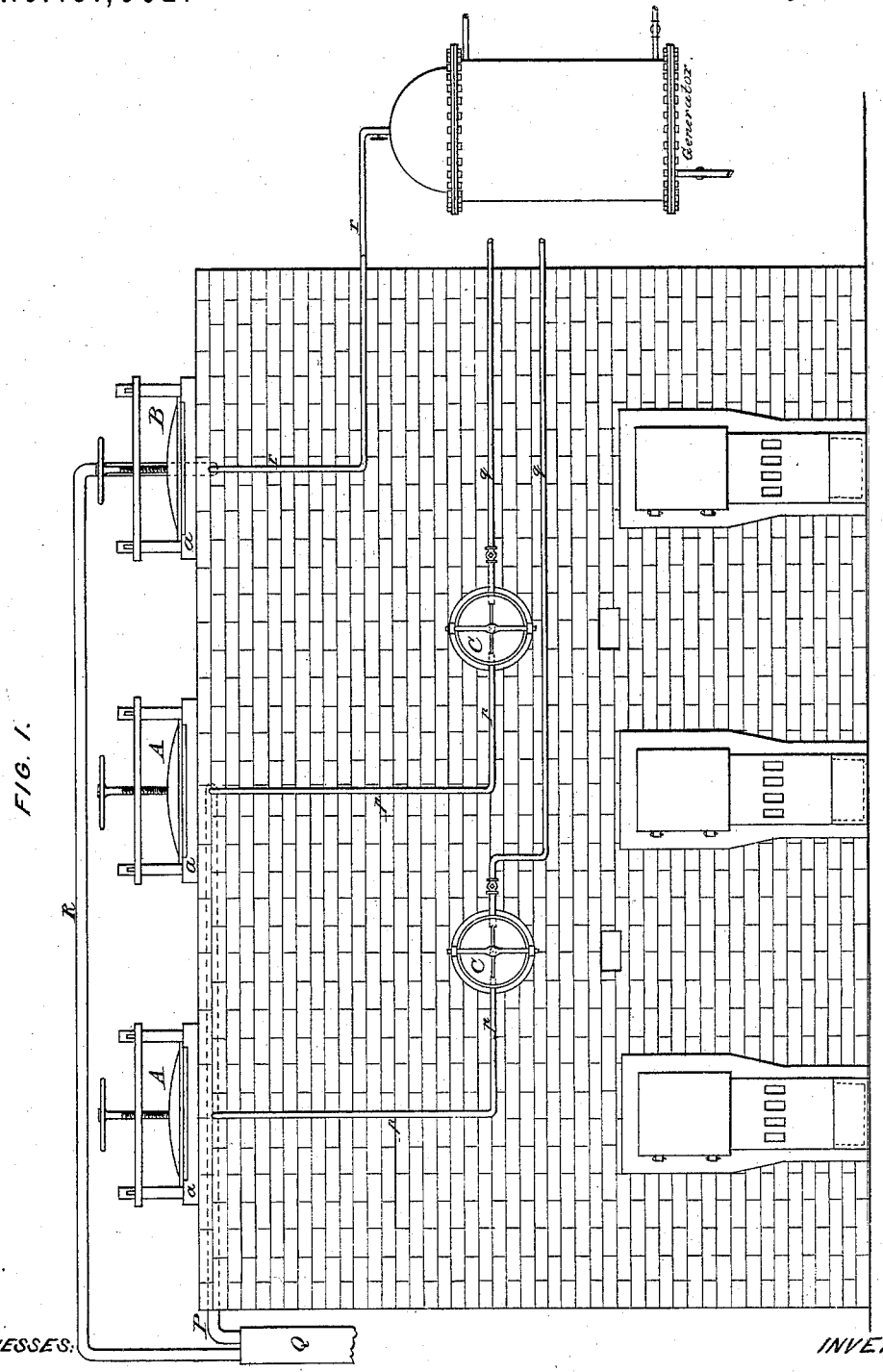

J. G. BLUNT.
Manufacture of Gas for Heating and Illuminating.
No. 151,002. Patented May 19, 1874.

J. G. BLUNT.
Manufacture of Gas for Heating and Illuminating.
No. 151,002. Patented May 19, 1874.
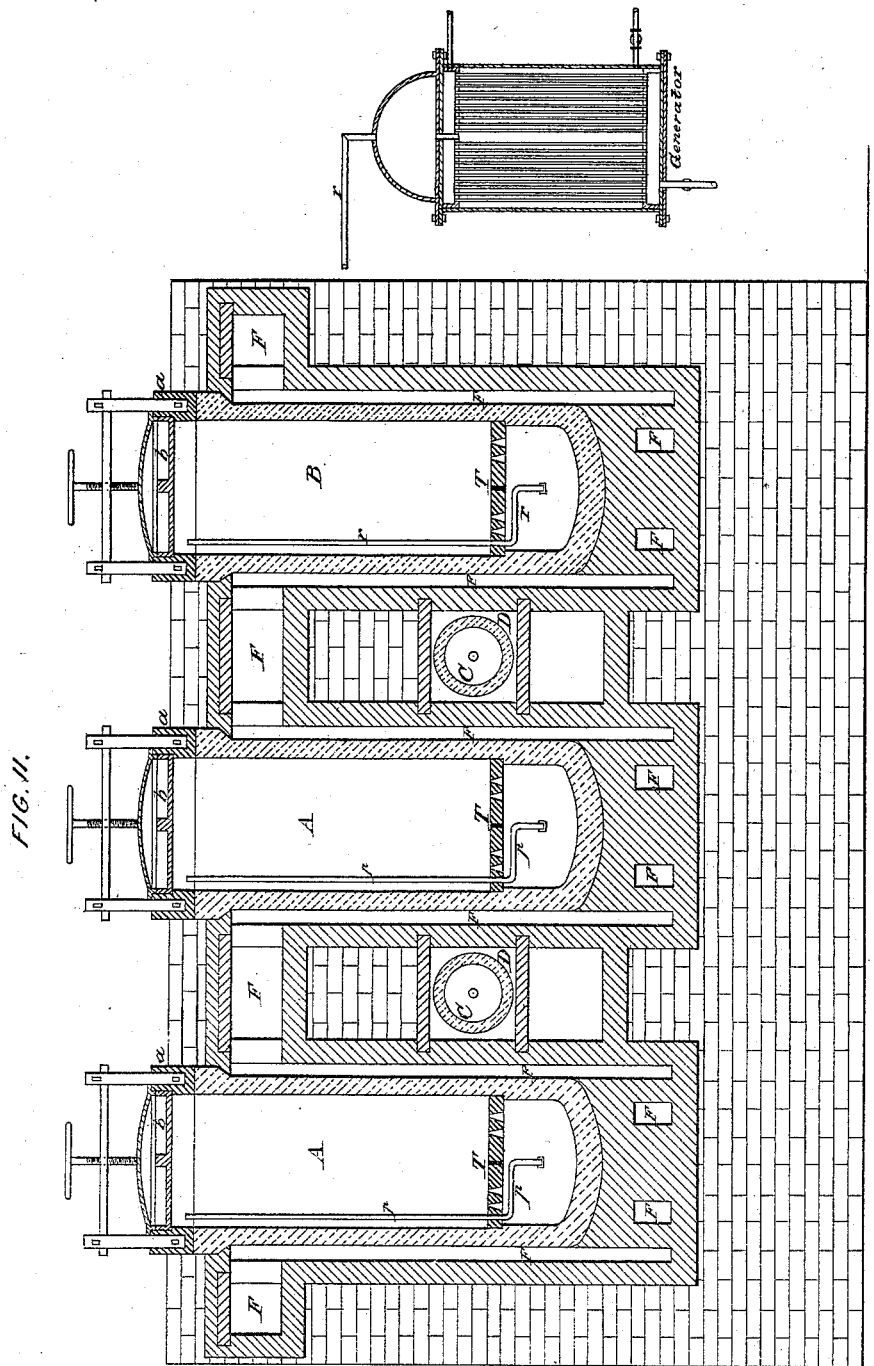

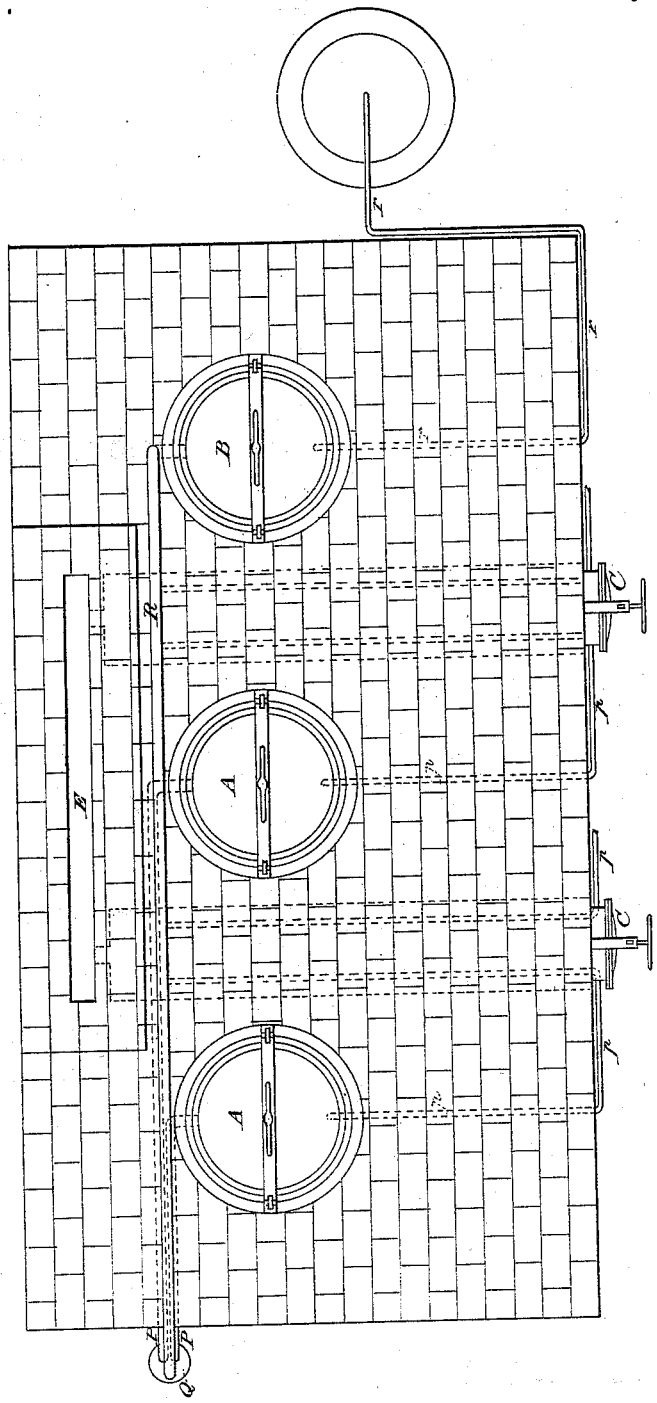
FIG. III.

J. G. BLUNT.
Manufacture of Gas for Heating and Illuminating.
No. 151,002. Patented May 19, 1874.
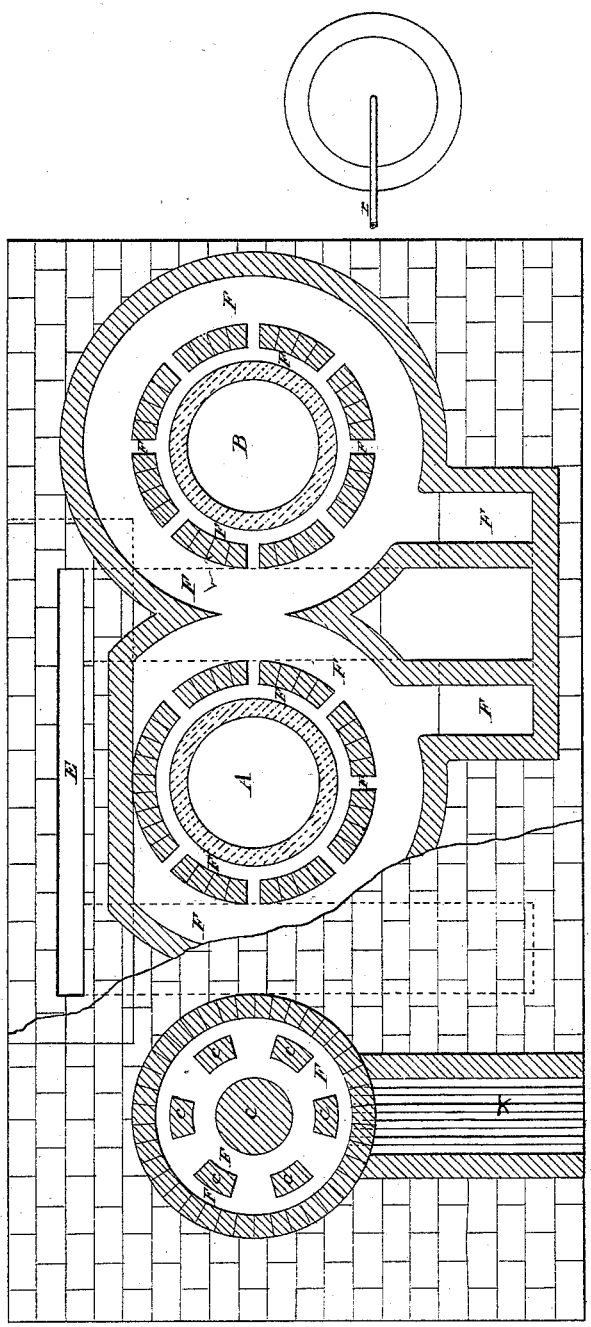
FIG. IV.
WITNESSES:
INVENTOR:

J. G. BLUNT.
Manufacture of Gas for Heating and Illuminating.
No. 151,002. Patented May 19, 1874.
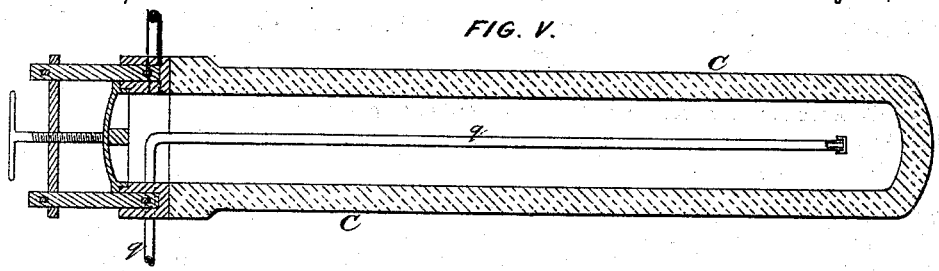
FIG. V.
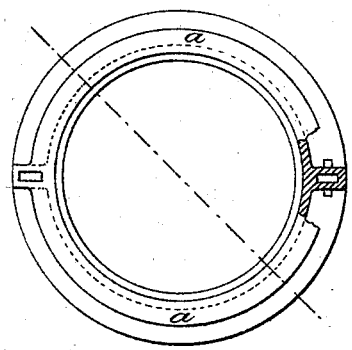
FIG. VI.
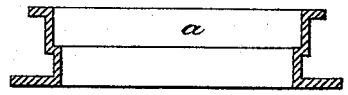
FIG. VII.
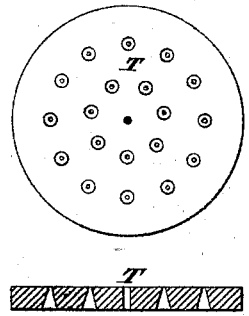
FIG. VIII.
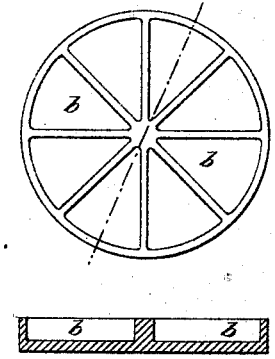
FIG. IX.
WITNESSES:
INVENTOR:
Jas. G. Blunt

UNITED STATES PATENT OFFICE.

JAMES G. BLUNT, OF LEAVENWORTH, KANSAS.

IMPROVEMENT IN THE MANUFACTURE OF GAS FOR HEATING AND ILLUMINATING.

Specification forming part of Letters Patent No. 151,002, dated May 19, 1874; application filed May 9, 1874.

*To all whom it may concern:*

Be it known that I, JAMES G. BLUNT, of Leavenworth, in the county of Leavenworth and State of Kansas, have invented certain new and useful Improvements in Device and Process for Manufacturing Hydrocarbon Gas for Illuminating and Heating Purposes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This specification relates to manufacturing hydrocarbon gas for illuminating and heating purposes, whereby the carbon gas is obtained from petroleum or other oleaginous substances, and then combined in any desired proportions with free hydrogen and carbonic-oxide gas, derived from the decomposition of steam in conjunction with coke, anthracite, or charcoal, or other incandescent carbon, in the manner hereinafter set forth.

Figure 1 represents a front elevation of a furnace containing a bench of three retorts. Fig. 2 represents a vertical section of the same through line of center, showing retorts, superheaters, flues, pipe-connections, &c. Fig. 3 represents a plan view of the top of furnace and retorts. Fig. 4 represents a sectional plan view of furnace and retorts near the upper portion of the same, and also a sectional plan view near the bottom of furnace, showing five grates, and the pins upon which the retorts rest. Fig. 5 is a longitudinal section of the fire-clay superheater. Fig. 6 is a plan view of the iron collar of retorts, and Fig. 7 a cross-section of same. Fig. 8 is a plan and cross-section of the perforated fire-clay tile, and Fig. 9 a plan and cross-section of the tray.

Similar letters of reference in the several figures indicate corresponding parts.

Letters A, A, and B, on Fig. 2, represent cylindrical fire-clay retorts, (the three constituting a bench,) set in line in a vertical position, and provided with separate fire-chambers, whereby they can be heated and operated independent of each other. The retort B is used in the manufacture of carbon gas from the vapor of petroleum or other oleaginous substance, and the retorts A A are used for the decomposition of steam, and its conversion into free hydrogen and carbonic-oxide gas, as hereinafter described. Letters T T T represent perforated fire-clay tiles, resting upon a shoulder or offset on the inner surface of the retorts, near the lower portion of the same, thus dividing them into three chambers or compartments, the chambers above the tiles in the retorts A A being filled, when in operation, with coke, anthracite, or charcoal, the same being required in the conversion of the decomposed steam into fixed gases. These tiles are movable and easily raised to the top of the retorts, when necessary to clean them (the retorts) from the débris or sediments of the coke or coal. Letters *a a a* represent the cast-iron necks or collars, which are adjusted to the upper and open end of the retorts by means of iron bolts, and to the upper flange of which iron lids are closely fitted and held in position by means of hand-screws. These lids can be readily removed, when necessary, to refill the retorts with charcoal or other incandescent carbon, or to remove the débris of the same. Letters *b b b* represent movable cast-iron trays, resting upon a shoulder or offset in the collars, the same being filled with a preparation of asbestus, to prevent, in a measure, the loss of heat by radiation from the top of the retorts. Letters *c c c c c c c*, in Fig. 4, represent the fire-brick pins upon which rest the retorts when set in their proper position. K is the grate in the combustion-chamber of the furnace. The fire-flues around the retorts, and thence to the smoke-stack or chimney E, are represented by the several letters F in Figs. 2 and 4. Letters D D, Fig. 2, represent the chambers or ovens in which are placed the clay superheaters C C.

My process of manufacturing hydrocarbon gas by the device above described is substantially as follows: The petroleum or carbon vapor is taken from the generator and conducted through the pipes to the lower chamber of the retort B, and then discharged through a perforated cap against the bottom of the same. In this retort, which when in operation is kept at a high degree of heat, the vapor is rapidly converted into fixed carbon gas, and, ascending upward, is taken from the top of the retort and conducted through pipe R, Fig. 1, to the larger pipe Q. This retort may be filled with fire-brick bats or pumice-stone, to afford greater and more uniform heating-surface for retorting the oil vapor. The carbon gas from the retort B being very rich, and requiring hydrogen as a diluent, to reduce it to the requisite standard of candle-power for illuminating purposes, the same is produced by taking steam from an ordinary boiler, and conveying the same through the pipes $q\ q$ to the superheater C, near the rear end of which it is discharged in the form of spray, and, after being heated to a high degree, is then conducted through the pipes $r\ r$ to the lower chambers of the retorts A A, and by the great heat applied to these retorts it is there thoroughly and rapidly decomposed, and, passing upward through the mass of heated coal or coke before referred to, the oxygen from the decomposed steam is thereby taken up by the incandescent carbon, forming a carbonic-oxide gas, and thus freeing the hydrogen. The perforated fire-clay tile in this process serves as an adjustable bottom or partition to the retorts, to hold up the coal or coke, and admit the passage of the decomposed steam from the lower chamber. These gases (the hydrogen and carbonic-oxide) are then conducted from the top of the retorts through the pipes P P to the large pipe Q, where, at a high temperature, they are combined with the rich carbon gas from the retort B, and the mixed gases are then conducted, by the pipe Q, direct to the holder, for distribution through the mains.

The combined gases by this process can be produced at any illuminating power desired, by the simple manipulation of the globe-valves regulating the admission of the steam and carbon vapor into the respective retorts.

Having thus described my invention, what I claim, and desire to secure by Letters Patent, is—

1. The cylindrical fire-clay retort, the perforated fire-clay tile, and cast-iron tray, substantially as shown, for the purposes set forth.

2. The combination of the fire-clay retort, set vertically, with the perforated tile and cast-iron tray, together with the superheater, fire-flues, and pipe-connections, substantially as shown, for the purposes set forth.

3. The process herein described of producing illuminating-gas, consisting in the production of carbon gas and water gas, or carbonic-oxide and hydrogen gases, in separate retorts, and then mixing in proportions to produce illuminating-gas of any desired candle-power, substantially as shown, for the purposes set forth.

In testimony that I claim the foregoing as my own invention I affix my signature in presence of two witnesses.

JAS. G. BLUNT.

Witnesses:
JOHN L. PENDERY,
JOHN FLETCHER.